(12) United States Patent
Pappu et al.

(10) Patent No.: US 11,231,927 B2
(45) Date of Patent: Jan. 25, 2022

(54) SYSTEM, APPARATUS AND METHOD FOR PROVIDING A FABRIC FOR AN ACCELERATOR

(71) Applicant: Intel Corporation, Santa Clara, CA (US)

(72) Inventors: Lakshminarayana Pappu, Folsom, CA (US); Robert D. Adler, Santa Clara, CA (US); Amit Kumar Srivastava, Folsom, CA (US); Aravindh Anantaraman, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 15/915,476

(22) Filed: Mar. 8, 2018

(65) Prior Publication Data

US 2019/0042240 A1  Feb. 7, 2019

(51) Int. Cl.
*G06F 9/30* (2018.01)
*G06F 3/06* (2006.01)

(52) U.S. Cl.
CPC .......... *G06F 9/3004* (2013.01); *G06F 3/0604* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| 8,929,373 | B2 | 1/2015 | Lakshmanamurthy et al. |
| 9,612,986 | B2* | 4/2017 | Iyer ........................ G06N 20/00 |
| 2011/0072234 | A1* | 3/2011 | Chinya ................. G06F 12/121 711/207 |
| 2013/0083798 | A1 | 4/2013 | Lakshmanamurthy et al. |
| 2013/0083804 | A1* | 4/2013 | Khoo ..................... G06F 13/38 370/401 |
| 2014/0115268 | A1* | 4/2014 | Beers .................. G06F 12/0828 711/146 |
| 2015/0092779 | A1 | 4/2015 | Lakshmanamurthy et al. |
| 2017/0184666 | A1 | 6/2017 | Pappu et al. |

(Continued)

OTHER PUBLICATIONS

Intel Corporation, "Product Brief. Intel Go Autonomous Driving Solutions. Autonomous Driving Accelerated," Nov. 2016, 6 pages.

(Continued)

*Primary Examiner* — Michael Sun
(74) *Attorney, Agent, or Firm* — Trop, Pruner & Hu, P.C.

(57) ABSTRACT

In one embodiment, an apparatus includes: an accelerator to execute instructions; an accelerator request decoder coupled to the accelerator to perform a first level decode of requests from the accelerator and direct the requests based on the first level decode, the accelerator request decoder including a memory map to identify a first address range associated with a local memory and a second address range associated with a system memory; and a non-coherent request router coupled to the accelerator request decoder to receive non-coherent requests from the accelerator request decoder and perform a second level decode of the non-coherent requests, the non-coherent request router to route first non-coherent requests to a sideband router of the first die and to direct second non-coherent requests to a computing die. Other embodiments are described and claimed.

20 Claims, 10 Drawing Sheets

(56) References Cited

U.S. PATENT DOCUMENTS

2018/0004530 A1\* 1/2018 Vorbach ............... G06F 9/3836
2019/0347125 A1\* 11/2019 Sankaran ............. G06F 9/3009

OTHER PUBLICATIONS

Infineon, "Highly Integrated and Performance Optimized 32-bit Microcontrollers for Automotive and Industrial Applications," Mar. 2017, 62 pages.

U.S. Appl. No. 15/718,178, filed Sep. 28, 2017, entitled "System, Apparatus and Method for Tunneling Validated Security Information," by Ruirui Huang, et al.

U.S. Appl. No. 15/391,984, filed Dec. 28, 2016, entitled "Method, Apparatus and System for Handling Non-Posted Memory Write Transactions in a Fabric," by Robert P. Adler, et al.

U.S. Appl. No. 15/338,639, filed Oct. 31, 2016, entitled "Method, Apparatus and System for Automatically Performing End-to-End Channel Mapping for an Interconnect," by Krishnan Srinivasan, et al.

U.S. Appl. No. 15/801,443, filed Nov. 2, 2017, entitled "System, Apparatus and Method for Functional Testing of One or More Fabrics of a Processor," by Lakshminarayana Pappu, et al.

U.S. Appl. No. 15/801,454, filed Nov. 2, 2017, entitled "System, Apparatus and Method for Inter-Die Functional Testing of an Integrated Circuit," by Lakshminarayana Pappu, et al.

\* cited by examiner

SYSTEM, APPARATUS AND METHOD FOR PROVIDING A FABRIC FOR AN ACCELERATOR

TECHNICAL FIELD

Embodiments relate to interconnect circuitry, and more particularly to a fabric for coupling to an accelerator.

BACKGROUND

Computing capabilities of general-purpose processors continue to increase. In many computing systems, increased instruction throughput for specialized operations can be enhanced by providing accelerators separate from such general-purpose processors. Oftentimes these accelerators may be adapted on separate circuit boards from the general-purpose processors. While specialized operation within these accelerators offloads bandwidth requirements from the general-purpose processor, there can be complexity in interconnecting memory and other resources to these acclerators.

DETAILED DESCRIPTION

In various embodiments, a modular system fabric is provided for an accelerator. This modular system fabric may be used to interconnect various components of an integrated circuit such as an accelerator device. Such integrated circuit may include multiple accelerators and other circuitry and may couple to system resources such as memory resources. In particular embodiments, this integrated circuit may be implemented on at least one semiconductor die, referred to herein as an accelerator die. The integrated circuit may be adapted on an industry standard computer expansion card, such as may couple to a motherboard or other system circuit board via a connector, e.g., a so-called M.2 or next generation form factor (NGFF) connector.

More specifically, a system fabric as provided herein may be designed with faster development times and lower costs than a typical system fabric. Also, this fabric may operate with reduced power consumption, by way of avoiding a ring-based topology and decoding operation performed close to the accelerators themselves. In addition, memory routing resources may be configured to similarly consume lower power, as less rigorous routing operations are performed by way of the decoding performed herein. In addition, the system fabric may be configured to efficiently identify local memory requests that can be handled at high bandwidths locally. Instead, requests directed to a general-purpose processor (namely non-coherent requests), may pass through more power-intensive portions of the fabric. However, since a relatively limited number of transactions proceed in this manner, such portions can be limited in size and scope, reducing complexity and power consumption. Stated another way, the fabric is designed to realize high bandwidth fabric connections for supporting local memory transactions, while providing reduced amounts of circuitry for relatively lower bandwidth handling of remote transactions. That is, as it is contemplated that more transactions are to be handled locally rather than remotely, more direct routes for handling the high bandwidth transactions are provided, and a limited amount of circuitry is provided for transactions that are to traverse a path to a general-purpose processor.

Figure 1:
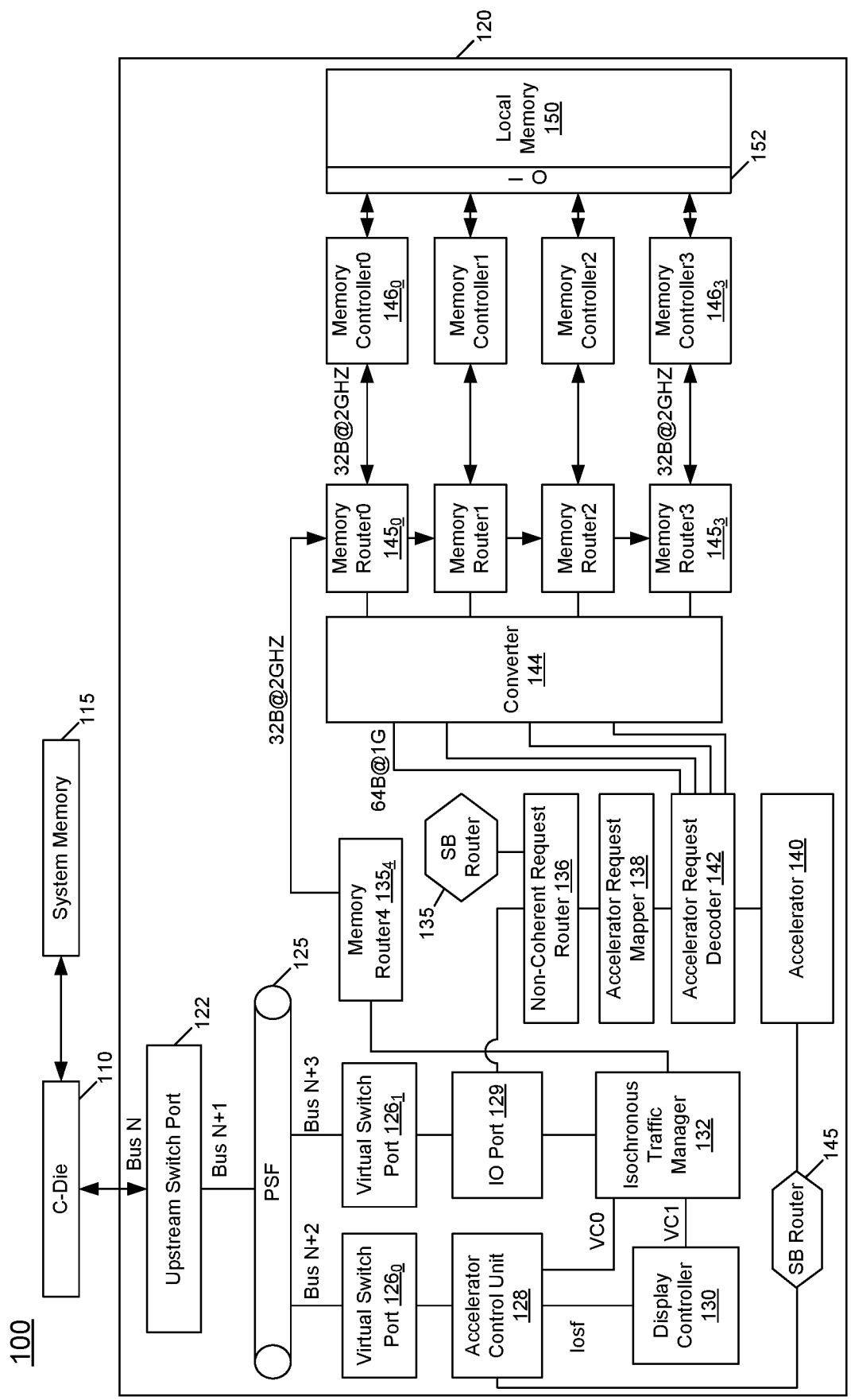
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may be any type of computing device, which can take many different forms, ranging from small form factor portable computer devices to larger computer devices such as server computers. In any event, as illustrated in FIG. 1, system 100 includes a computing die 110. As an example, computing die 110 may be a multicore processor or other system on chip (SoC) implemented in a given semiconductor package, such as a standalone integrated circuit (IC). In turn, computing die 110 couples to an accelerator die 120. In embodiments herein, accelerator die 120 may be present within another semiconductor package such as accelerator integrated circuit. In particular embodiments herein, accelerator die 120 itself may be present within an accelerator integrated circuit that is adapted on a separate circuit board, e.g., a Peripheral Component Interconnect Express (PCIe) card. In turn, this card couples to an NGFF connector of a system circuit board, such as a motherboard that houses computing die 110.

As illustrated, a system memory 115 couples to computing die 110. Such system memory may be implemented as a dynamic random access memory (DRAM), e.g., as one or more dual in-line memory modules (DIMMs). While memory traffic between computing die 110 and system memory 115 may be coherent (in that cache coherency is maintained with regard to internal caches of computing die 110), note that system memory 115 itself (and computing die 110) remains non-coherent with regard to accelerator die 120 and memory associated with accelerator die 120.

In the embodiment of FIG. 1, accelerator die 120 includes an upstream switch port 122 that may be coupled by way of one or more buses (e.g., bus N) to computing die 110. In an embodiment, upstream switch port 122 may be implemented as a PCIe device having x16 links. In turn, upstream switch port 122 couples to a primary scalable fabric (PSF) 125 via another bus (bus N+1). In turn, PSF 125 operates as an on-chip fabric to decode and route transactions accordingly. In an embodiment, PSF 125 may be implemented as an integrated on-chip scalable fabric (IOSF) which may be designed according to a given specification of a semiconductor manufacturer to provide a standardized on-die interconnect protocol for attaching components within a chip, such as intellectual property (IP) blocks. Based upon, e.g., address information associated with incoming transactions from computing die 110, these transactions may be provided to one of multiple virtual switch ports $126_{0,1}$. As illustrated, virtual switch port $126_0$ couples to PSF 125 via another bus (bus N+2), while in turn virtual switch port $126_1$ couples to PSF 125 via another bus (bus N+3).

Virtual switch port $126_0$ couples downstream to an accelerator control unit 128. Accelerator control unit 128 may be implemented as so-called glue logic that implements interface circuitry for communication between computing die 110 and accelerator die 120. More specifically accelerator control unit 128 may be used for purposes of providing configuration and other low bandwidth traffic information between computing die 110 and accelerator die 120. To this end, accelerator control unit 128 couples to an accelerator 140 via a sideband router 145. As further shown, accelerator control unit 128 may couple, e.g., by way of a given on-chip interconnect (e.g., an IOSF interconnect) to a display controller 130 (which in turn may couple to a display (not shown for ease of illustration in FIG. 1)). Accelerator control unit 128 further couples to an isochronous traffic manager 132, which also may be in communication with display controller 130. Isochronous traffic manager 132 may be used for relatively high speed main band traffic (e.g., data transmissions). More specifically as shown, isochronous traffic manager 132 couples via different virtual channels to accelerator control unit 128 and display controller 130, such that differentiating traffic may be directed via these different virtual channels (and which may have different priorities) to given destinations and/or from given sources. As further illustrated, isochronous traffic manager 132 couples to a memory router $135_4$.

As further illustrated in FIG. 1, virtual switch port $126_1$ couples to an input/output (I/O) port 129 that in turn couples to a non-coherent request router 136. Note that I/O port 129 may be configured to convert accelerator non-coherent requests to a primary protocol for communication via PSF 125, to enable the requests to be routed inter-die from accelerator die 120 to computing die 110. In embodiments herein, non-coherent request router 136 may be configured to route upstream requests to a non-coherent destination, namely system memory 115. Non-coherent request router 136 may include an address map. More specifically, this address map may be programmed via basic input/output system (BIOS) or other system software or firmware. In an embodiment, this address map may include information to indicate where transactions are to be routed. More specifically, non-coherent request router 136 includes mapping information to indicate: (i) transactions (essentially low-speed traffic) that are to be directed to a sideband router to configure local blocks (to this end, each on-chip agent to be configured has its space map programmed into the address map); and (ii) transactions that are non-coherent and are to be routed upstream to system memory 115, which as described herein is maintained non-coherently with regard to accelerator die 120.

With this address map, non-coherent request router 136 may decode incoming non-coherent requests and categorize such requests based on an address range within which the requests falls. As such, non-coherent request router 136 routes transactions either towards PSF 125 for upstream communication or to sideband router 135. In general, non-coherent requests that correspond to memory transactions for system memory may be forwarded to PSF 125. Instead, read/write configuration transactions directed to components within accelerator die 120 may be sent, via sideband router 135, to such components.

In turn, sideband router 135 may be coupled to various agents within accelerator die 120 (connections not shown for convenience of illustration in FIG. 1). As examples, sideband router 135 may couple to disparate agents, such as a power management agent and one or more configuration agents to configure various components of accelerator die 120 such as memory controllers and so forth. As such, non-coherent request router 136 may route configuration-type and sideband information-type transactions via sideband router 135.

Still with reference to FIG. 1, non-coherent request router 136 also couples to an accelerator request mapper 138. In embodiments herein, accelerator request mapper 138 may be configured to manage requests being directed towards non-coherent request router 136. As there may be multiple requests being directed to the same address, such requests may be managed within accelerator request mapper 138 by storage in a given buffer, such as a first-in first-out (FIFO) buffer. Note that in such scheme, reads requests may bypass write requests.

In turn, accelerator request mapper 138 couples to an accelerator request decoder 142 that further couples to an accelerator 140. Accelerator request decoder 142 may be configured to implement a first level of transaction decoding for upstream transactions from accelerator 140. More specifically, accelerator request decoder 142 may be configured, based upon an incoming system address, to direct requests towards a local memory 150 or, e.g., system memory 115 coupled to computing die 110. As such, with this multiple level decoding configuration, this first level of decoding is performed closer to accelerator 140, thus avoiding the need for higher power consuming interconnect structures such as a ring topology. By avoiding a typical ring structure, maintenance and validation costs are reduced, while ensuring that accelerator die 120 remains within an allowed power envelope. Furthermore, by way of this configuration in which accelerator request decoder 142 directs local high bandwidth requests to a converter 144 and instead directs upstream requests via accelerator request mapper 138, a limited number of requests pass through mapper 138. As such, accelerator request mapper 138 may be configured with a limited number of finite state machines (FSMs), reducing complexity and power consumption. And in this arrangement of multi-level transaction decoding, note that non-coherent request router 136 may be configured to implement a second level of transaction decoding for upstream transactions, to determine whether such transactions are for internal die destinations or to computing die 110.

In embodiments, accelerator 140 may be configured to work in conjunction with computing die 110 to accelerate particular functions. To this end, computing die 110 may offload specific tasks to accelerator 140 to free up its bandwidth for other workloads. Although the scope of the present invention is not limited in this regard, such specialized tasks or functions may include: 3D graphics rendering and games; communicating particular resolution video streams from a server to a client device; and facial recognition applications for machine learning and so forth.

For high bandwidth transactions with local memory 150, accelerator request decoder 142 may, using an internal mapping structure, identify a given one of multiple channels on which such local transactions may be directed towards local memory 150. In embodiments, accelerator request decoder 142 may receive core-to-uncore (C2U) requests, C2U responses and C2U data from accelerator 140. For C2U requests, accelerator request decoder 142 may use an opcode of the request to decode whether the transaction is to be directed towards local memory 150 or towards computing die 110. If a transaction is directed to computing die 110, the request may pass via non-coherent request router 136 (and intervening accelerator request mapper 138) and via I/O port 129 in an upstream direction to computing die 110. Instead for local memory requests, accelerator request decoder 142 includes a hash engine to perform memory hash functions based on an address of a given local memory transaction to route the transactions via an appropriate memory router (namely one or more routers $145_0$-$145_3$). Note that with the directed communication of local memory requests realized by way of the internal memory map within accelerator request decoder 142, memory routers 145 may be implemented as light weight switches, with reduced power consumption and complexity. In an embodiment, memory routers 145 may have characteristics including: (i) decoding a limited CPU address range that is strictly dedicated to the memory transactions; (ii) routing the transactions to specific (predetermined) memory controllers; and (iii) handling traffic mostly expected to flow in one direction. In contrast, a complex set of routers conventionally used typically involves a mesh kind of network mapping "n" source nodes to "m" destination nodes and configurations associated therewith, which if implemented may undesirably increase complexity and power consumption. Still further, accelerator request decoder 142 may receive incoming responses (e.g., from local memory 150), which may be in the form of uncore-to-core (U2C) responses, and direct them appropriately (e.g., to a given one of multiple accelerators, in the case of a multi-accelerator die). Accelerator request decoder 142 may be configured to track requests directed towards memory, e.g., via a set of request trackers.

Note that while a single accelerator is shown for convenience, in particular embodiments multiple accelerators may be present on a given accelerator die. In different cases, accelerator 140 may be implemented as a graphics engine, media engine, machine learning engine or other specialized processing circuitry. As examples in cases where accelerator 140 is a graphics accelerator, accelerator die 120 may be implemented on a discrete graphics card. Where accelerator 140 is implemented as a media accelerator, such implementation may be by way of video encode/decode engines such as for server instantiations, e.g., for social media companies. In cases in which accelerator 140 is a machine learning engine, such engines may be used for artificial intelligence/inference in deep learning applications, and which may be implemented in expansion cards for servers of service providers or others.

Note that in embodiments herein, local memory 150 may be implemented as on-die memory. In other cases, the local memory may be implemented as standalone memory devices such as double data rate (DDR) or low power DDR memory that couples to accelerator die 120 (and which may be adapted on a given card with accelerator die 120).

As illustrated further in FIG. 1, accelerator request decoder 142 may couple via multiple channels to a converter 144. In embodiments herein, converter 144 may be configured to convert so-called intra-die interconnect (IDI) transactions received from accelerator request decoder 142 to a format for communication to a given one of multiple memory routers (namely memory routers $145_0$-$145_3$). Note that memory routers 145 may be configured to receive inputs from multiple sources and route them either to a corresponding memory controller 146 or to a neighboring memory router 145. In this regard, such memory routers may include address maps to identify ranges of memory for which the given router is responsible.

Memory routers 145 may be configured to honor priority requests, e.g., virtual channel requests, and use one or more arbitration techniques to determine priority of incoming requests. In turn, each memory router $145_0$-$145_3$ may couple via a corresponding high bandwidth memory interconnect (e.g., 32 bytes (B) at 2 gigahertz (GHz)) to a corresponding memory controller $146_0$-$146_3$. In turn, each memory controller 146 may couple via a corresponding interconnect to memory 150. More specifically, such interconnects may couple via an I/O section 152 of memory 150 to be directed to particular channels within local memory 150. Understand while shown at this high level in the embodiment of FIG. 1, many variations and alternatives are possible.

Figure 2:
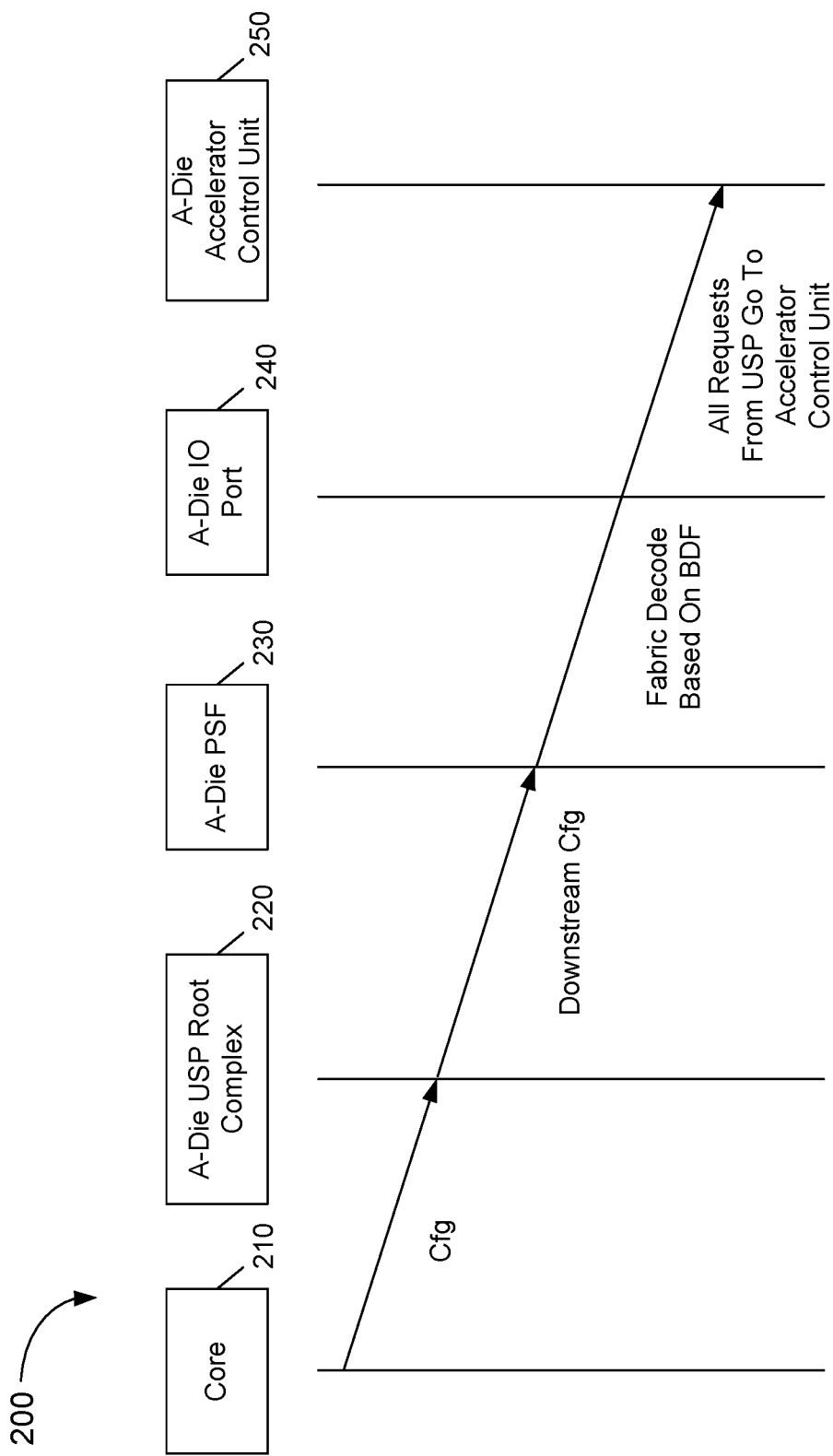
FIG. 2 is a high level view of a method for communicating a configuration request in accordance with an embodiment.

Referring now to FIG. 2, shown is a high level view of a method for communicating a configuration request in accordance with an embodiment. More specifically as shown in FIG. 2, a transaction flow 200 is illustrated for performing configuration of an accelerator component in accordance with an embodiment. As illustrated, transaction flow 200 is initiated via a configuration request (cfg) issued by a core 210. Note that core 210 may be a general-purpose processing core of a multicore processor or other SoC which may be implemented in a computing die separate from an accelerator die. And understand that core 210 may execute software such as BIOS, an operating system (OS) or other system software that initiates the execution of a configuration operation, in this instance for an accelerator component. One example of a configuration request may be on boot up, the accelerator (e.g., graphics) drivers are loaded into a system memory that is coupled to a main application processor (e.g., a CPU or other SoC). The CPU invokes these drivers and these drivers configure various aspects on the accelerator die. As an example, during PCIe device enumeration, the PCIe driver assigns bus, device, and function numbers to each of the PCIe devices on the accelerator card. After this configuration, every device knows what its unique identification number is so that it can claim transactions addressed to it. As another example, a display driver in the system memory may configure display components and enable them when the system is to render data to a display.

Still with reference to FIG. 2, this configuration request is received in the accelerator die at an upstream port (USP) root complex 220. In an embodiment, this root complex may be implemented as a PCIe device such as a PCIe switch port. In turn, root complex 220 directs this configuration request downstream to a primary scalable fabric 230 of the accelerator die. The fabric may perform a fabric decode of this configuration transaction. In an embodiment, such decode may be based on bus device function (BDF) information of the configuration transaction to identify a destination of the configuration request. Assume for purposes of discussion that this decoding indicates that the configuration transaction is to be directed to a particular accelerator of the accelerator die (which may include one or more such accelerators). As such, PSF 230 may forward the configuration request to an accelerator control unit 250 (which may couple to the PSF via a virtual switch port), bypassing an I/O port 240. In embodiments, such accelerator control unit may be implemented within the accelerator itself, or may be coupled to the accelerator. In any event, when the configuration request is received in accelerator control unit 250, various configuration operations according to the configuration transaction may occur to appropriately configure the accelerator for the requested arrangement. Understand while shown at this high level in the embodiment of FIG. 2, many variations and alternatives are possible.

Figure 3:
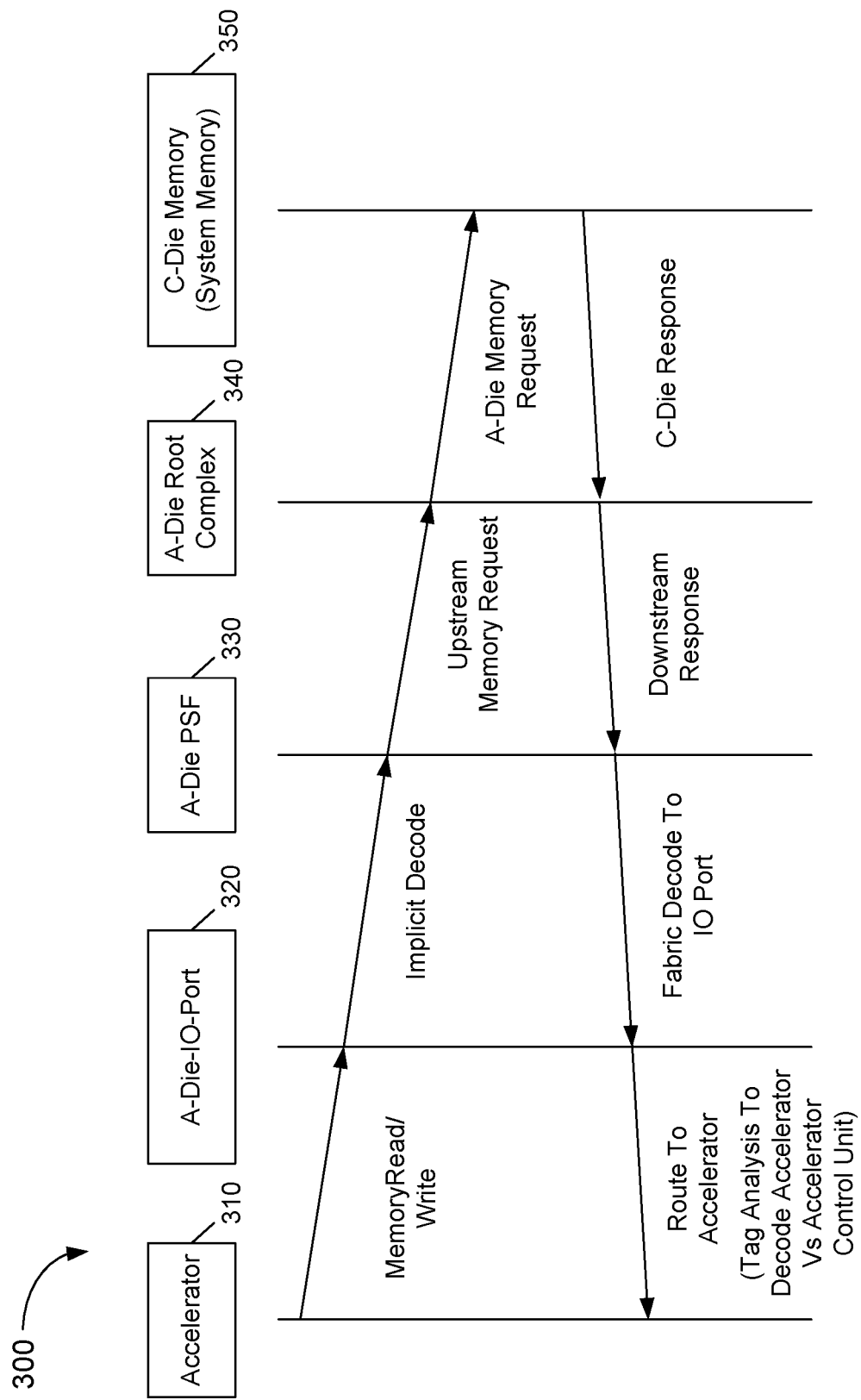
FIG. 3 is a high level view of a method for a request/response protocol between an accelerator die and a data source in accordance with an embodiment.

Referring now to FIG. 3, shown is a high level view of a method for a request/response protocol between an accelerator die and a data source, such as a system memory. More specifically FIG. 3 illustrates a transaction flow 300 for performing a memory operation issued from an accelerator 310 to a system memory 350 (which may be a system memory of a computing device in turn coupled to a computing die). As such, system memory 350 may be maintained non-coherently with regard to accelerator 310 of an accelerator die. As illustrated, transaction flow 300 begins via issuance by accelerator 310 of a memory read or write operation (MemRd/write) issued from accelerator 310, and directed as a system memory request to an I/O port 320. Note that while shown as a direct communication between accelerators 310 and I/O port 320, such request may pass through intervening structures, such as a request decoder, mapper and/or router. In any case, I/O port 310 may implicitly decode the request and direct it to a PSF 330 (to which I/O port 320 may be coupled via an intervening virtual switch port, in some cases). In turn, PSF 330 may identify the request as an upstream memory request and forward it to a root complex 340, which may be configured as an upstream switch port that directs the request to a computing die. In turn, the computing die may process the request to determine that it is a memory request directed to a particular location in system memory. Accordingly, various resources of the computing die such as an integrated memory controller may direct the request to system memory to perform the read or write operation.

Assume that the memory request is a read request. As such, system memory 350 may obtain the requested data and provide it back downstream towards the requestor, namely accelerator 310. Thus as illustrated further in FIG. 3, this response may be directed downstream through root complex 340 and to PSF 330, which in turn may perform a fabric decode to determine the destination. As such, PSF 330 directs the response to I/O port 320 that in turn routes it back to accelerator 310. In embodiments, note that intervening routing/mapping/decode structures within the accelerator die may perform various levels of decoding, including tag analysis to determine whether this read data is to be directed to accelerator 310 itself or to another location, such as an accelerator control unit (of or coupled to the accelerator). Understand while shown at this high level in the embodiment of FIG. 3, many variations and alternatives are possible.

Figure 4:
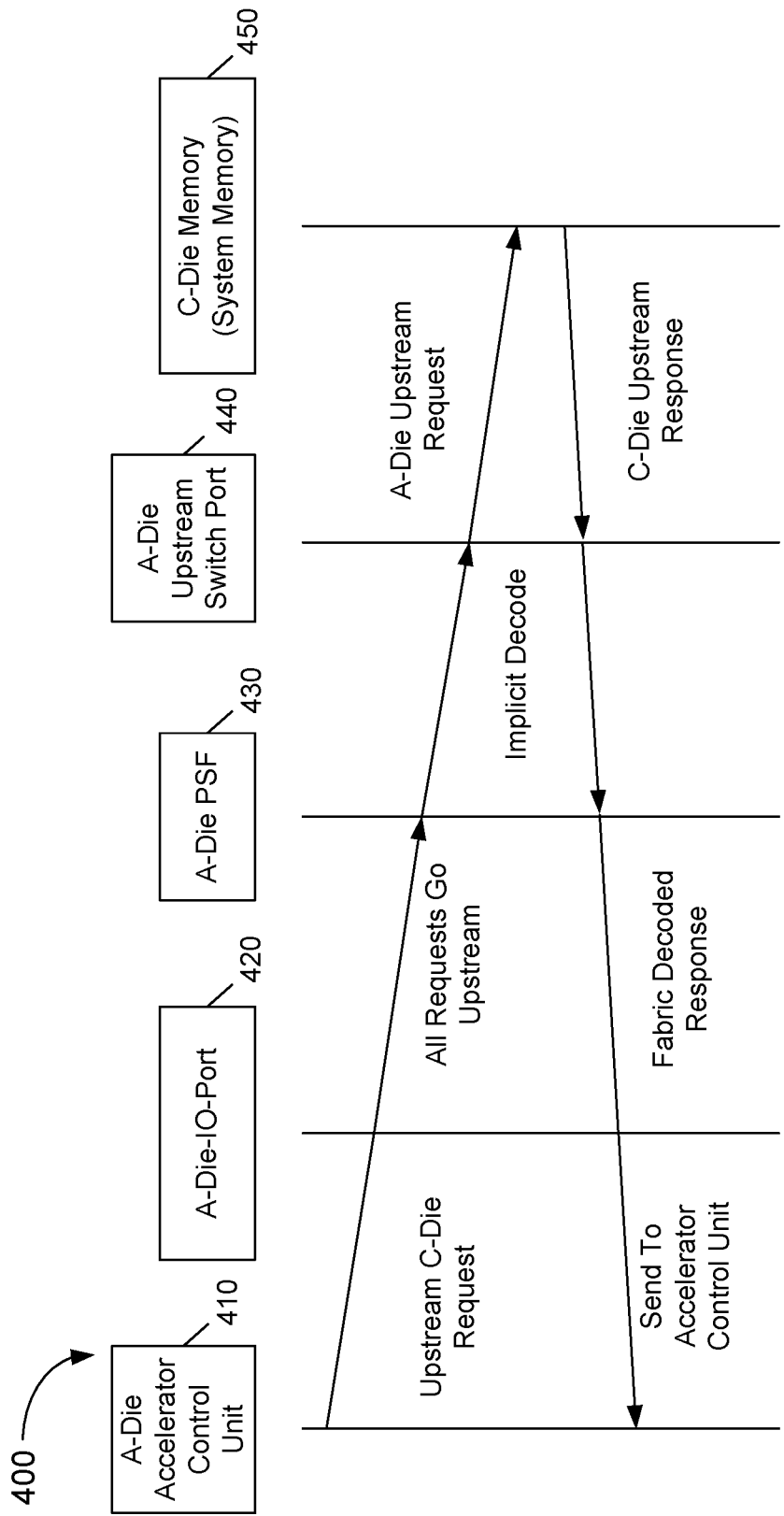
FIG. 4 is a high level view of a method for handling requests issuing from an accelerator control unit to a system memory in accordance with an embodiment.

Referring now to FIG. 4, shown is a high level view of a method for handling requests issuing from an accelerator control unit to a system memory. More specifically, transaction flow 400 of FIG. 4 may proceed similarly to transaction flow 300 of FIG. 3. Note however that instead of the request issuing from the accelerator itself, here the request is issued from an accelerator control unit 410. And further note that the request passes directly through I/O port 420 and is directed upstream directly to PSF 430. As with transaction flow 300, from PSF 430, which performs an implicit decode, the transaction is forwarded upstream via upstream switch port 440 and to system memory 450. In turn, the corresponding response from system memory 450 flows downstream back through switch port 440 and via PSF 430, which performs a fabric decode of the response to send it directly to accelerator control unit 410.

Figure 5:
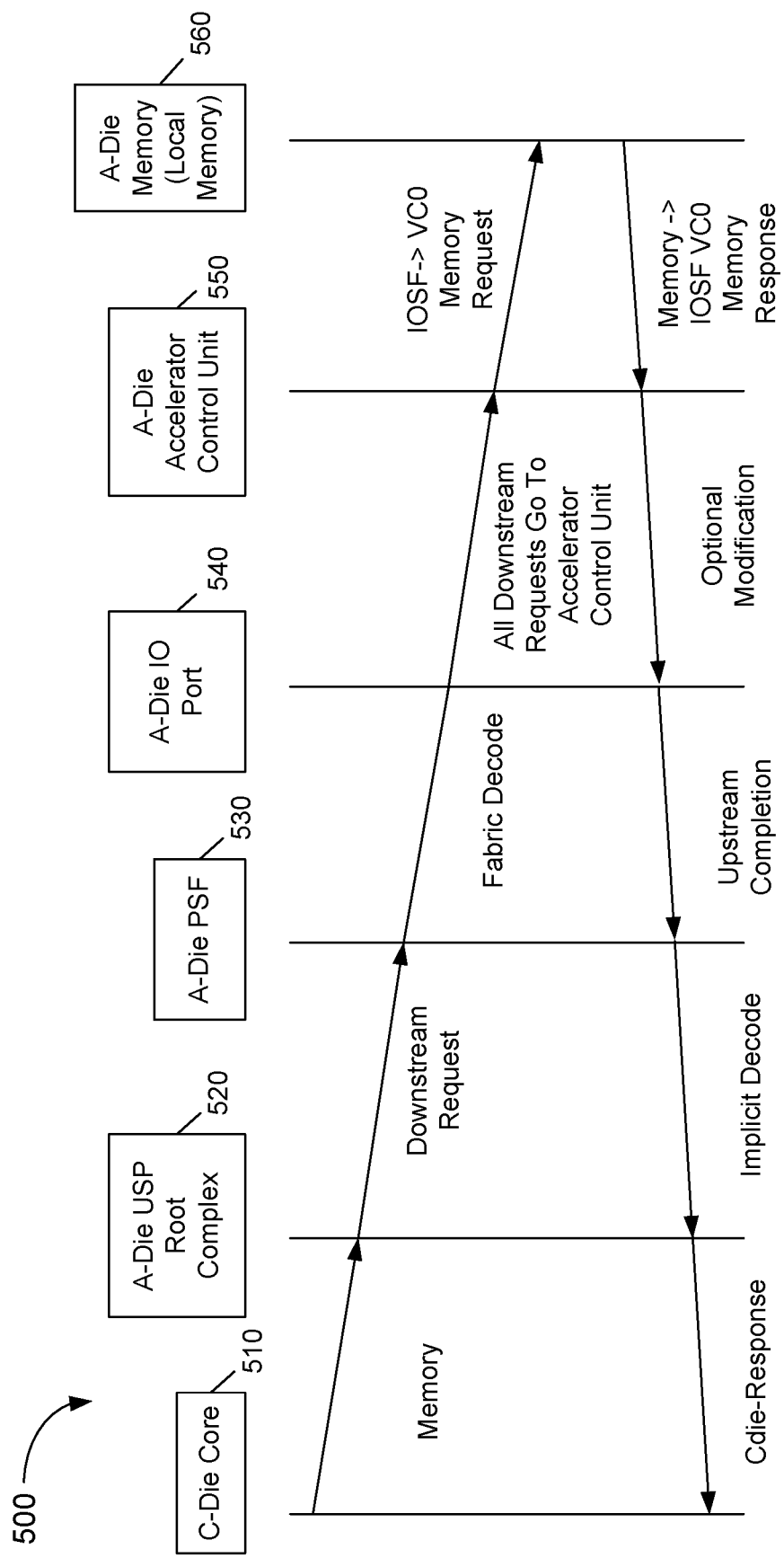
FIG. 5 is a high level view of a method for handling a memory request from a compute die to a local memory of an accelerator die in accordance with an embodiment.

Referring now to FIG. 5, shown is a high level view of a method for handling a memory request from a compute die to a local memory of an accelerator die in accordance with an embodiment. More specifically as illustrated in FIG. 5, transaction flow 500 details a method for handling a memory request, issued from a core 510 of a computing die that is directed to a local memory of an accelerator die. As illustrated, transaction flow 500 begins via a core 510 issuing a memory request downstream to an accelerator die. More specifically, this request is received via an upstream switch port root complex 520. Root complex 520 directs this downstream request to a PSF 530, which performs a fabric decode. With this fabric decode that identifies this downstream request, note that the request is directly sent to an accelerator control unit 550 (bypassing I/O port 540). In turn, accelerator control unit 550 may issue the memory request, received via an on-chip interconnect as a request having a given priority according to a particular virtual channel (e.g., virtual channel 0). As illustrated, accelerator control unit 550 forwards this memory request, e.g., via the given virtual channel to local memory 560 that in turn performs the memory request (e.g., a read or write operation).

As illustrated, local memory 560 thus issues a memory response via the same virtual channel and directs it to accelerator control unit 550. In some cases, accelerator control unit 550 may optionally modify this response. For example, in a virtualization environment, the data stored in the local memory can be modified before sending it to the system (cores). For example, if the system is managing ten devices, each device can have the same local address "0xab" that means different things to different agents. However, as far as the system is concerned there are unique addresses. Hence, these accelerator units convert virtual address-to-physical address and vice versa. Accelerator control unit 550 then issues a response as an upstream completion to PSF 530, which performs an implicit decode to direct the completion upstream via root complex 520 to core 510 as a response. Understand while shown at this high level in the embodiment of FIG. 5, many variations and alternatives are possible.

Figure 6:
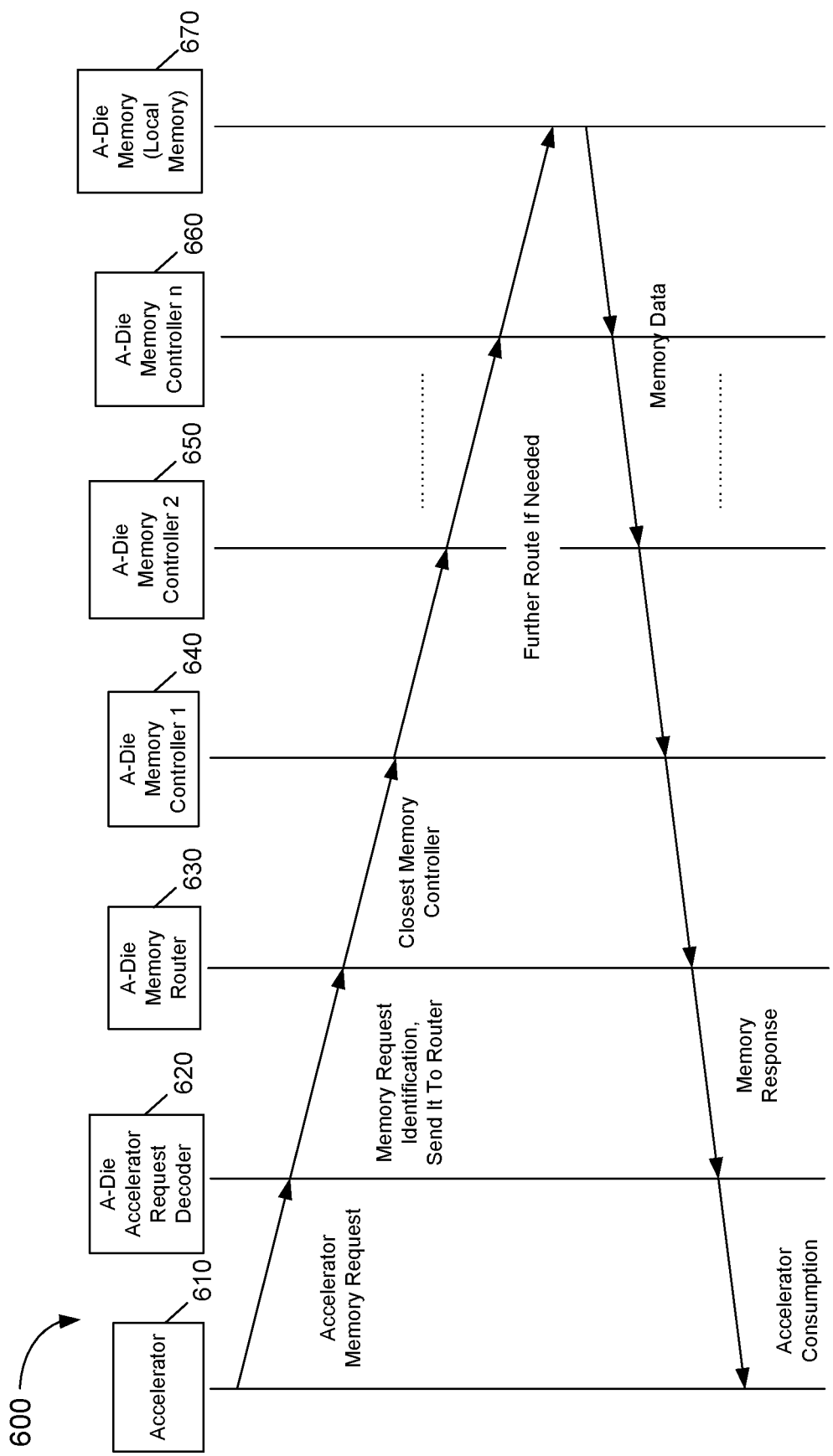
FIG. 6 is a high level view of a method for handling local memory requests in accordance with an embodiment.

Referring now to FIG. 6, shown is a high level view of a method for handling local memory requests. More specifically, transaction flow 600 of FIG. 6 may be used for communicating local memory requests from an accelerator 610 to a local memory 670. As seen, this accelerator memory request is provided to accelerator request decoder 620 which may determine, based upon its local map, that the request is directed to local memory. As such, accelerator request decoder 620 forwards the request, e.g., via a converter (not shown for ease of illustration in FIG. 6) to a particular one of multiple memory routers 630 according to the address of the memory request. In turn, router 630 may forward the request to the closest (e.g., directly coupled) memory controller 640. If for some reason this memory request is not for a portion of memory owned by this particular memory controller, additional routing from one memory controller to another (as seen from first memory controller 640 to second memory controller 650 and potentially to third memory controller 660) may occur. Otherwise, the memory request is routed directly from memory controller 640 to local memory 670 for fulfilling the memory request (e.g., a read request). As such, memory data may be communicated back via the appropriate memory controller and router and through accelerator request decoder 620 to accelerator 610 for consumption. Understand while shown at this high level in the embodiment of FIG. 6, many variations and alternatives are possible.

Figure 7:
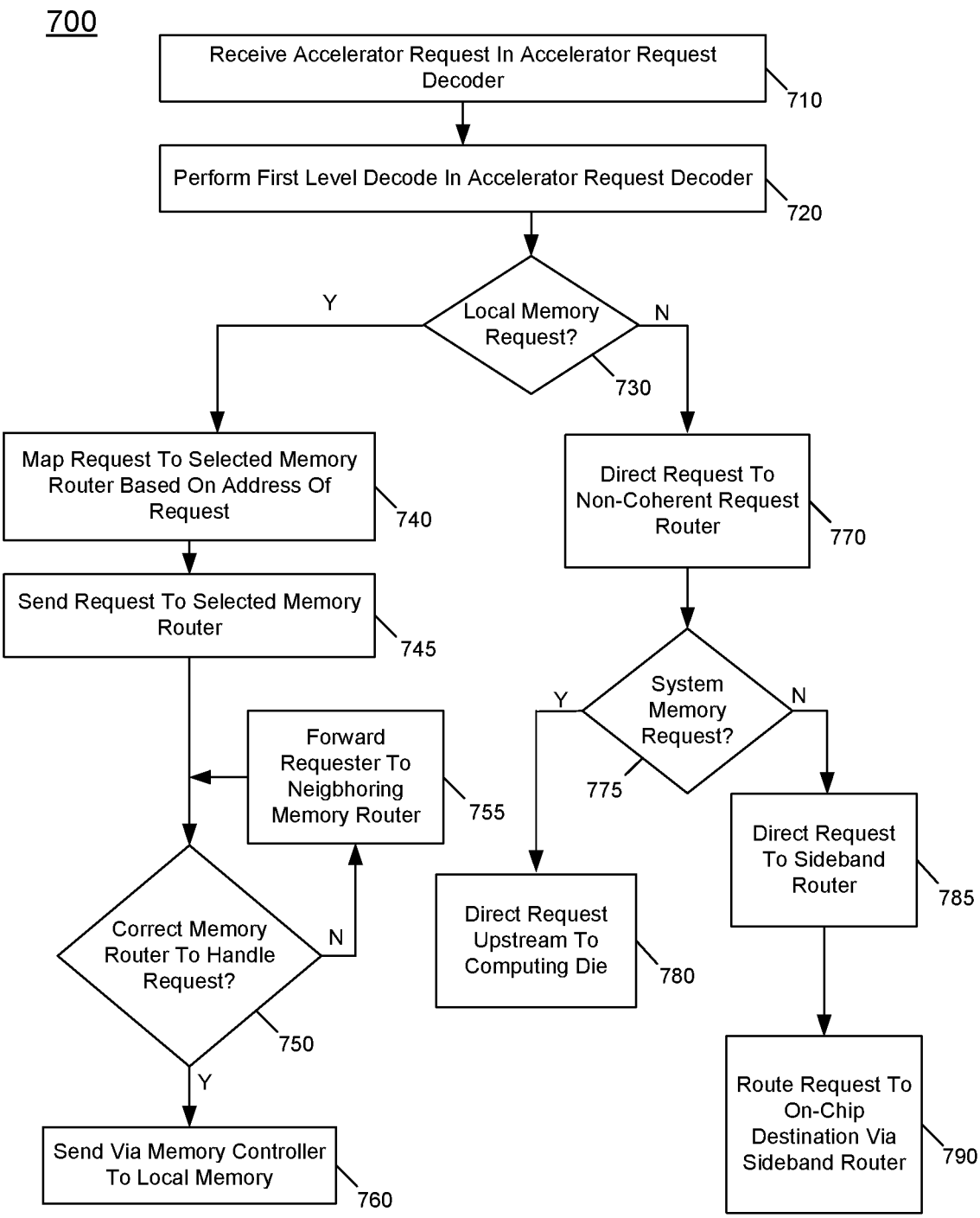
FIG. 7 is a flow diagram of a method in accordance with an embodiment of the present invention.

Referring now to FIG. 7, shown is a flow diagram of a method in accordance with an embodiment of the present invention. More specifically, method 700 is a method for performing a multiple level decode of a transaction in a system fabric of an accelerator die as described herein. As such, method 700 may be performed by hardware circuitry, firmware, software and/or combinations thereof. As illustrated in FIG. 7, method 700 begins by receiving a request in an accelerator request decoder (block 710). This accelerator request decoder may be closely coupled with the accelerator to receive the request. Next, at block 720 a first level decode is performed on this request in the accelerator request decoder. More specifically, an address of the request may be used to access the memory map of the accelerator request decoder to identify an intended target of the request.

Still with reference to FIG. 7, based on this first level of decode, it is determined at diamond 730 whether the request is directed to local memory, namely a local memory (a coherent memory) associated with the accelerator die. If so, control passes to block 740 where the accelerator request decoder can map the request to a particular memory router. More specifically, based upon a memory map, the accelerator request decoder can identify one of multiple memory routers to which the request can be sent. As such, control passes to block 745 where the request is sent to this selected memory router. Note that the accelerator request decoder may send this request on a given channel that couples, e.g., via a converter, to the selected memory router. Next it is determined whether the memory router that receives the request is the correct memory router for handling the request (diamond 750). In an embodiment, each memory router may include address range registers to identify an address range with which the memory router is associated. If it determined that this is the correct memory router, control passes to block 760 where the request is sent to local memory. More specifically, the memory router may forward the request to a corresponding memory controller that in turn may issue the request to memory, allocate tracking resources of the memory controller for handling the memory return and so forth.

Instead if it is determined that the memory router is not the correct router, control passes to block 755 where the memory router may forward the request to a neighboring memory router such that the determination at diamond 750 may again be performed in this neighboring memory router. As such, a loop of the operations at diamond 750 and block 755 may occur iteratively until the correct memory router is found.

Still with reference to FIG. 7, if it is determined at diamond 730 that the received request is not a local memory request, the accelerator request decoder directs the request to a non-coherent request router (block 770). Note that the request may pass through intervening structures, such as an accelerator request mapper prior to being delivered to the non-coherent request router.

In any event, control passes from block 770 to diamond 775 to determine whether the request is a system memory request, namely a request directed to a non-coherent system memory coupled to a computing die that in turn couples to the accelerator die. If so, control passes to block 780 where the request is directed upstream to the computing die where it may be processed to direct the request for handling in the system memory.

Instead, if it is determined that the request is a local transaction (e.g., a configuration or sideband transaction) and not for system memory, control passes from diamond 775 to block 785. There, the non-coherent request router may direct the request to a sideband router. Note that such sideband router may couple to various agents of the accelerator die and may be used to direct a variety of sideband transactions such as configuration transactions, monitoring transactions and so forth. As such, at block 790 the sideband router may route the request to an on-chip destination, e.g., a given component to which the request is directed. Note that in some cases, this sideband request may traverse multiple sideband routers before being sent to a destination component. Understand while shown at this high level in the embodiment of FIG. 7, many variations and alternatives are possible.

Figure 8:
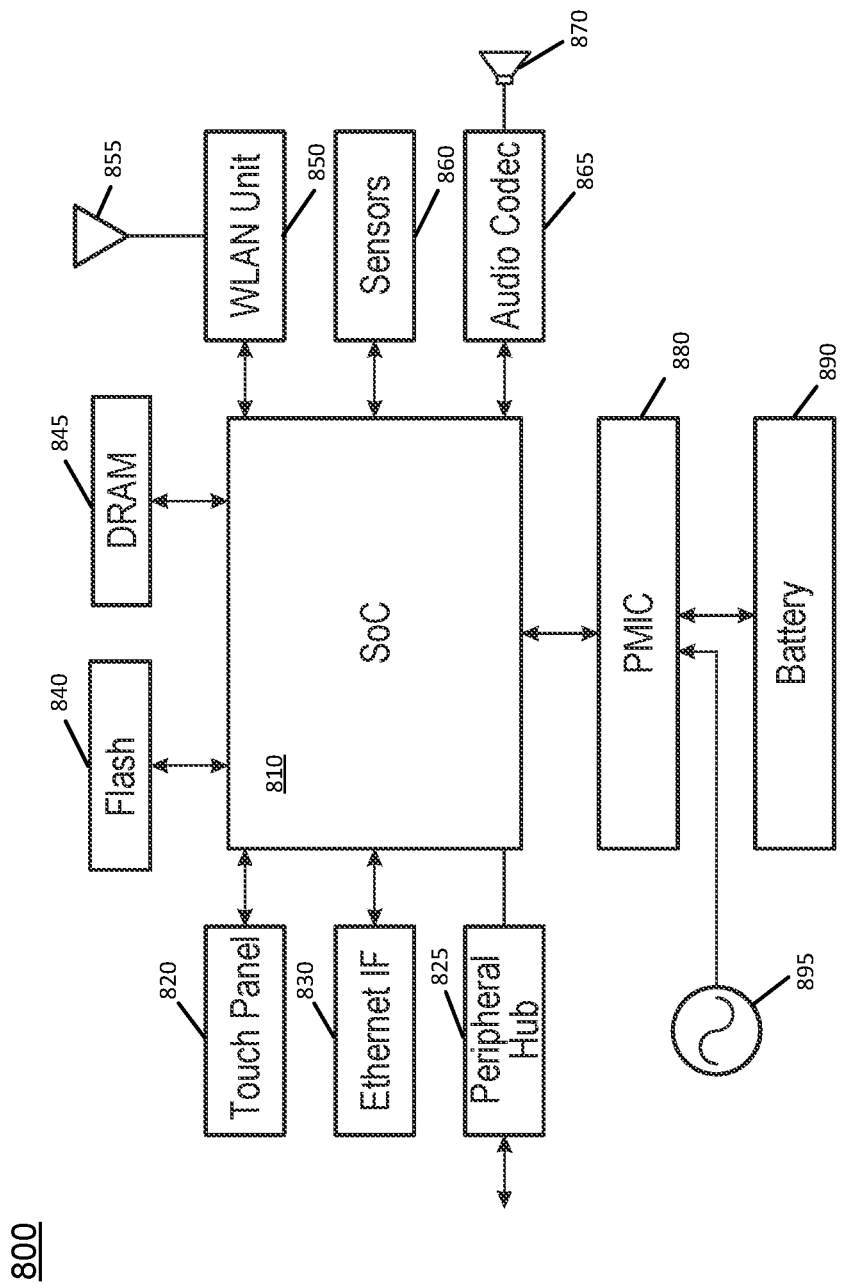
FIG. 8 is a block diagram of an example system with which embodiments may be used.

Embodiments as described herein may be implemented in a wide variety of system types, ranging from small portable devices to larger more compute complex devices. Referring now to FIG. 8, shown is a block diagram of an example system with which embodiments may be used. In the illustration of FIG. 8, system 800 may be a mobile system such as a tablet computer, 2:1 tablet, phablet, in-vehicle system, or other system. As illustrated, a SoC 810 is present and may be configured to operate as an application processor for the device. SoC 810 may include multiple die including a compute die and an accelerator die having a system fabric as described herein.

A variety of devices may couple to SoC 810. In the illustration shown, a memory subsystem includes a flash memory 840 and a DRAM 845 coupled to SoC 810. In addition, a touch panel 820 is coupled to the SoC 810 to provide display capability and user input via touch, including provision of a virtual keyboard on a display of touch panel 820. To provide wired network connectivity, SoC 810 couples to an Ethernet interface 830. A peripheral hub 825 is coupled to SoC 810 to enable interfacing with various peripheral devices, such as may be coupled to system 800 by any of various ports or other connectors.

In addition to internal power management circuitry and functionality within SoC 810, a PMIC 880 is coupled to SoC 810 to provide platform-based power management, e.g., based on whether the system is powered by a battery 890 or AC power via an AC adapter 895. In addition to this power source-based power management, PMIC 880 may further perform platform power management activities based on environmental and usage conditions. Still further, PMIC 880 may communicate control and status information to SoC 810 to cause various power management actions within SoC 810.

Still referring to FIG. 8, to provide for wireless capabilities, a WLAN unit 850 is coupled to SoC 810 and in turn to an antenna 855. In various implementations, WLAN unit 850 may provide for communication according to one or more wireless protocols. As further illustrated, a plurality of sensors 860 may couple to SoC 810. These sensors may include various accelerometer, environmental and other sensors, including user gesture sensors. Finally, an audio codec 865 is coupled to SoC 810 to provide an interface to an audio output device 870. Of course understand that while shown with this particular implementation in FIG. 8, many variations and alternatives are possible.

Figure 9:
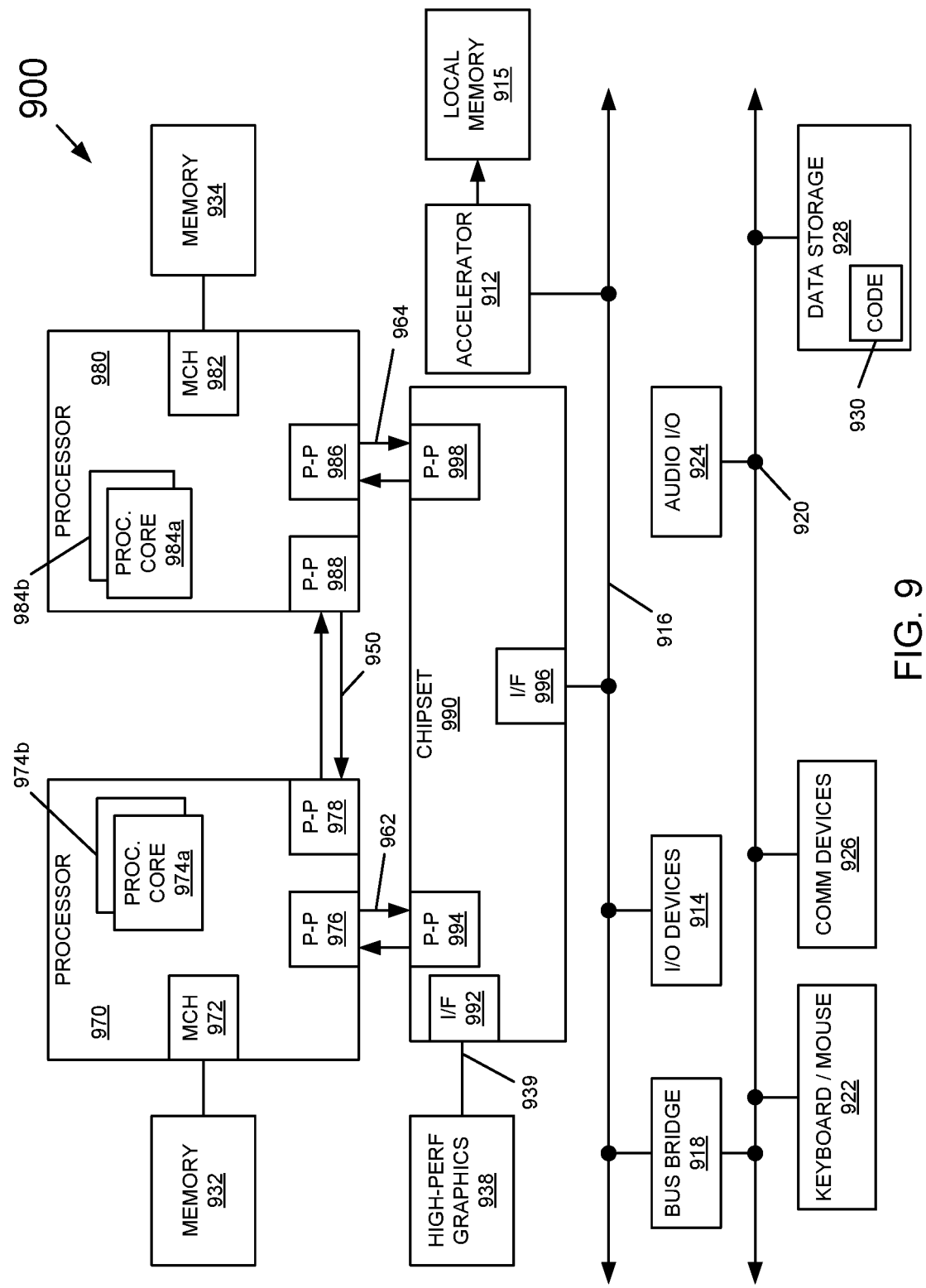
FIG. 9 is a block diagram of a system in accordance with an embodiment of the present invention.

Referring now to FIG. 9, shown is a block diagram of a system in accordance with an embodiment of the present invention. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974*a* and 974*b* and processor cores 984*a* and 984*b*), although potentially many more cores may be present in the processors.

Still referring to FIG. 9, first processor 970 further includes a memory controller hub (MCH) 972 and point-topoint (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 962 and 964, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. First bus 916 also may couple to an accelerator 912, to which a local memory 915 is coupled. Accelerator 912 may include a system fabric to perform a multiple level decode, as described herein. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920. Embodiments can be incorporated into other types of systems including mobile devices such as a smart cellular telephone, tablet computer, netbook, Ultrabook™, or so forth.

Figure 10:
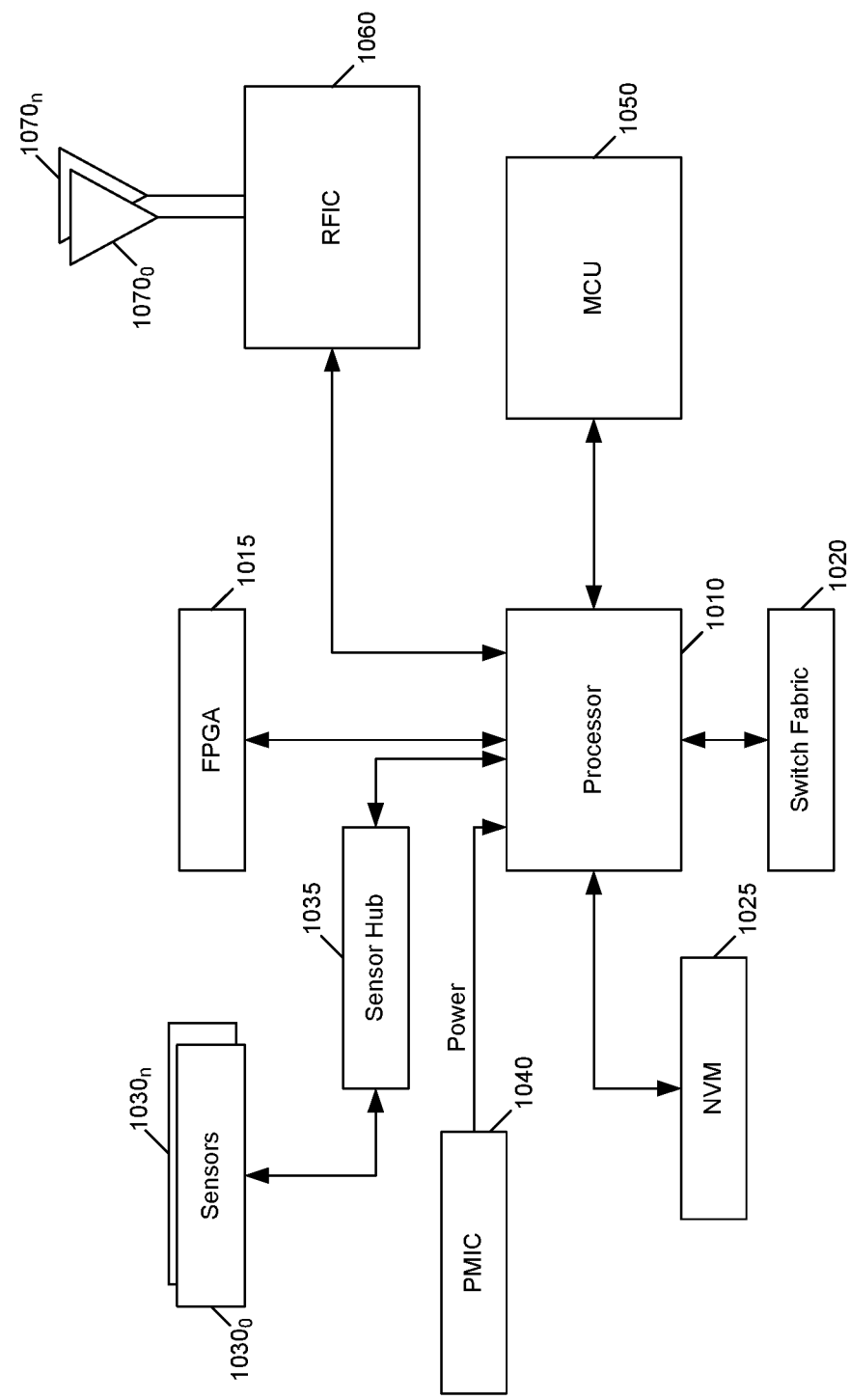
FIG. 10 is a block diagram of a system in accordance with another embodiment of the present invention

Referring now to FIG. 10, shown is a block diagram of a system in accordance with another embodiment of the present invention. In the embodiment of FIG. 10, system 1000 is an autonomous driving computing system. As such, system 1000 may be implemented within a vehicle that provides for some level of autonomous driving. Understand that with different levels of autonomous driving control, different levels of workloads may be executed within system 1000 to autonomously perform some or all driving tasks autonomously.

As illustrated, system 1000 includes a processor 1010, which may be a general-purpose multicore processor or other SoC. Processor 1010 may include multiple die including a compute die and an accelerator die having a system fabric as described herein. In different implementations, multiple such processors may be implemented to flexibly allocate autonomous driving workloads across these processors. Processor 1010 receives power that is controlled by a power management integrated circuit (PMIC) 1040.

System 1000 may further include one or more field programmable gate arrays (FPGAs) 1015 or other programmable accelerators to which certain autonomous driving workloads may be offloaded. Processor 1010 further couples to a non-volatile memory 1025, which in an embodiment may be implemented as a flash memory. To provide communication with other components within a vehicle, processor 1010 further couples to a switch fabric 1020 which in an embodiment may be implemented as an Ethernet switch fabric that in turn may couple to other components within a vehicle, including display components, vehicle infotainment systems, and so forth. Still further, processor 1010 (and switch fabric 1020) also couples to a microcontroller 1050.

Furthermore, to enable interaction with other systems, including other vehicles, roadway systems, over-the-air update sources, infotainment content sources, sensor data communication and so forth, processor 1010 and MCU 1050 may couple to one or more radio frequency integrated circuits (RFICs) 1060. In embodiments, RFIC 1060 may be configured to support 5G-based specifications for communication of automotive and other data via a variety of wireless networks. To this end, RFIC 1060 may couple to one or more antennas $1070_0$-$1070_n$ of a vehicle.

As further illustrated in FIG. 10, system 1000 may include a plurality of sensors $1030_0$-$1030_n$ that provide sensor information, via a sensor hub 1035 to processor 1010. Although the scope of the present invention is not limited in this regard in embodiments, such sensors may include lidar, ultrasound, radar and optical sensors, among other sensor types. Such sensors may obtain large amounts of sensor data while the vehicle is in operation. Sensor hub 1035 may be configured to fuse at least some of this data to provide information regarding the vehicle's surroundings, for provision to processor 1010. In turn, processor 1010 and/or FPGA 1015 may use this fused sensor information in connection with performing autonomous driving workloads. Understand while shown at this high level in the embodiment of FIG. 10, many variations and alternatives are possible.

The following examples pertain to further embodiments.

In one example, an apparatus includes: an accelerator formed on a first die to execute instructions; an accelerator request decoder coupled to the accelerator to perform a first level decode of requests from the accelerator and direct the requests based on the first level decode, the accelerator request decoder including a memory map to identify a first address range associated with a local memory and a second address range associated with a system memory; an accelerator request mapper coupled to the accelerator request decoder to track non-coherent requests; and a non-coherent request router coupled to the accelerator request mapper to receive the non-coherent requests from the accelerator request mapper and perform a second level decode of the non-coherent requests, the non-coherent request router to route first non-coherent requests to a sideband router of the first die and to direct second non-coherent requests to a computing die to couple to the first die.

In an example, the apparatus further comprises a converter including a plurality of input channels to receive local memory requests from the accelerator request decoder and convert the local memory requests to a memory format for communication to the local memory.

In an example, the apparatus further comprises: a plurality of memory routers coupled to the converter; and a plurality of memory controllers each coupled to one of the plurality of memory routers.

In an example, the accelerator request decoder is to execute a memory hash function on an address of a request to identify a target memory router of the plurality of memory routers to receive the request.

In an example, a first memory router of the plurality of memory routers is to: route a first local memory request to a first memory controller coupled to the first memory router, the first memory router associated with an address range to which the first memory controller is coupled; and route a second memory request to a second memory router coupled to the first memory router, when the second memory request is not associated with the address range to which the first memory controller is coupled.

In an example, the apparatus comprises an accelerator device to be coupled to a system circuit board, the accelerator device comprising a first integrated circuit comprising the first die and one or more memory integrated circuits comprising the local memory.

In an example, the apparatus further comprises one or more cores coupled to the accelerator, where the one or more cores are to offload at least one specialized function to the accelerator.

In another example, a method comprises: receiving a request from an accelerator in an accelerator request decoder coupled to the accelerator; performing a first level decode of the request in the accelerator request decoder; based on the first level decode, directing the request to a local memory associated with the accelerator if the request is a coherent request; and based on the first level decode, directing the request to a non-coherent request router if the request is a non-coherent request.

In an example, the method further comprises performing a second level decode of the request in the non-coherent request router.

In an example, the method further comprises: based on the second level decode, directing the request upstream to a computing die if the request targets a system memory; and based on the second level decode, directing the request to a sideband router if the request is one of a configuration request or a sideband request.

In an example, the method further comprises, when the request is the configuration request or the sideband request, routing the request from the sideband router to an on-chip destination agent.

In an example, the method further comprises, when the request is the coherent request, mapping the request to a selected memory router of a plurality of memory routers based on the first level decode.

In an example, the method further comprises forwarding the request from the selected memory router to a neighboring memory router if the request is not associated with an address range associated with the selected memory router.

In an example, the method further comprises sending the request to the local memory via a first memory controller coupled to the selected memory router.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a computing die including one or more cores; a system memory coupled to the computing die, the system memory to be maintained coherently with the computing die; an accelerator die coupled to the computing die, the accelerator die including at least one accelerator, an accelerator request decoder coupled to the at least one accelerator to perform a first level decode of requests from the at least one accelerator and direct the requests based on the first level decode, the accelerator request decoder including a memory map to identify a first address range associated with a local memory and a second address range associated with the system memory, and a non-coherent request router coupled to the accelerator request decoder to receive non-coherent requests from the accelerator request decoder and perform a second level decode of the non-coherent requests; and a local memory coupled to the accelerator die, the local memory to be maintained coherently with the accelerator die and non-coherently with the computing die and the system memory.

In an example, the non-coherent request router is to route first non-coherent requests to a sideband router of the accelerator die and to direct second non-coherent requests to the computing die.

In an example, the system further comprises: a plurality of memory routers coupled to the accelerator request decoder; and a plurality of memory controllers each coupled to one of the plurality of memory routers.

In an example, the accelerator request decoder is to execute a memory hash function on an address of a request to identify a target memory router of the plurality of memory routers to receive the request.

In an example, a first memory router of the plurality of memory routers is to: route a first local memory request to a first memory controller coupled to the first memory router, the first memory router associated with an address range of the local memory to which the first memory controller is coupled; and route a second memory request to a second memory router coupled to the first memory router, when the second memory request is not associated with the address range of the local memory to which the first memory controller is coupled.

In an example, the system further comprises an accelerator card including the accelerator die and the local memory, the accelerator card coupled to the computing die via a physical connector.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    an accelerator formed on a first die to execute instructions;
    an accelerator request decoder coupled to the accelerator to perform a first level decode of requests from the accelerator and direct the requests based on the first level decode, the accelerator request decoder including a memory map to identify a first address range associated with a local memory and a second address range associated with a system memory;
    an accelerator request mapper coupled to the accelerator request decoder to track non-coherent requests; and
    a non-coherent request router coupled to the accelerator request mapper to receive the non-coherent requests from the accelerator request mapper and perform a second level decode of the non-coherent requests, the non-coherent request router to route first non-coherent requests to a sideband router of the first die and to direct second non-coherent requests to a computing die to couple to the first die.

2. The apparatus of claim 1, further comprising a converter including a plurality of input channels to receive local memory requests from the accelerator request decoder and convert the local memory requests to a memory format for communication to the local memory.

3. The apparatus of claim 2, further comprising:
    a plurality of memory routers coupled to the converter; and
    a plurality of memory controllers each coupled to one of the plurality of memory routers.

4. The apparatus of claim 3, wherein the accelerator request decoder is to execute a memory hash function on an address of a request to identify a target memory router of the plurality of memory routers to receive the request.

5. The apparatus of claim 3, wherein a first memory router of the plurality of memory routers is to:
    route a first local memory request to a first memory controller coupled to the first memory router, the first memory router associated with an address range to which the first memory controller is coupled; and
    route a second memory request to a second memory router coupled to the first memory router, when the second memory request is not associated with the address range to which the first memory controller is coupled.

6. The apparatus of claim 1, wherein the apparatus comprises an accelerator device to be coupled to a system circuit board, the accelerator device comprising a first integrated circuit comprising the first die and one or more memory integrated circuits comprising the local memory.

7. The apparatus of claim 1, further comprising one or more cores coupled to the accelerator, wherein the one or more cores are to offload at least one specialized function to the accelerator.

8. A non-transitory machine-readable medium having stored thereon instructions, which if performed by a machine cause the machine to perform a method comprising:
    receiving a request from an accelerator in an accelerator request decoder of an accelerator die coupled to the accelerator, the accelerator die comprising the accelerator;
    performing a first level decode of the request in the accelerator request decoder;
    based on the first level decode, directing the request to a local memory associated with the accelerator if the request is a coherent request; and
    based on the first level decode, directing the request to a non-coherent request router of the accelerator die if the request is a non-coherent request.

9. The non-transitory machine-readable medium of claim 8, wherein the method further comprises performing a second level decode of the request in the non-coherent request router.

10. The non-transitory machine-readable medium of claim 9, wherein the method further comprises:
    based on the second level decode, directing the request upstream to a computing die if the request targets a system memory; and
    based on the second level decode, directing the request to a sideband router if the request is one of a configuration request or a sideband request.

11. The non-transitory machine-readable medium of claim 10, wherein the method further comprises, when the request is the configuration request or the sideband request, routing the request from the sideband router to an on-chip destination agent.

12. The non-transitory machine-readable medium of claim 8, wherein the method further comprises, when the request is the coherent request, mapping the request to a selected memory router of a plurality of memory routers based on the first level decode.

13. The non-transitory machine-readable medium of claim 12, wherein the method further comprises forwarding the request from the selected memory router to a neighboring memory router if the request is not associated with an address range associated with the selected memory router.

14. The non-transitory machine-readable medium of claim 12, wherein the method further comprises sending the request to the local memory via a first memory controller coupled to the selected memory router.

15. A system comprising:
    a computing die including one or more cores;
    a system memory coupled to the computing die, the system memory to be maintained coherently with the computing die;
    an accelerator die coupled to the computing die, the accelerator die including at least one accelerator, an accelerator request decoder to perform a first level decode of requests from the at least one accelerator and direct the requests based on the first level decode, the accelerator request decoder including a memory map to identify a first address range associated with a local memory and a second address range associated with the system memory, and a non-coherent request router to receive non-coherent requests from the accelerator request decoder and perform a second level decode of the non-coherent requests; and a local memory coupled to the accelerator die, the local memory to be maintained coherently with the accelerator die and non-coherently with the computing die and the system memory.

16. The system of claim 15, wherein the non-coherent request router is to route first non-coherent requests to a sideband router of the accelerator die.

17. The system of claim 15, further comprising:
a plurality of memory routers coupled to the accelerator request decoder; and
a plurality of memory controllers each coupled to one of the plurality of memory routers.

18. The system of claim 17, wherein the accelerator request decoder is to execute a memory hash function on an address of a request to identify a target memory router of the plurality of memory routers to receive the request.

19. The system of claim 17, wherein a first memory router of the plurality of memory routers is to:
route a first local memory request to a first memory controller coupled to the first memory router, the first memory router associated with an address range of the local memory to which the first memory controller is coupled; and
route a second memory request to a second memory router coupled to the first memory router, when the second memory request is not associated with the address range of the local memory to which the first memory controller is coupled.

20. The system of claim 15, further comprising an accelerator card including the accelerator die and the local memory, the accelerator card coupled to the computing die via a physical connector.

* * * * *